(12) United States Patent
Cooke

(10) Patent No.: US 6,189,518 B1
(45) Date of Patent: Feb. 20, 2001

(54) FUEL SUPPLY AND COLD START APPARATUS FOR AN INTERNAL COMBUSTION ENGINE

(75) Inventor: Syd Cooke, Colorado Springs, CO (US)

(73) Assignee: Emission Controls Corp., Reno, NV (US)

( * ) Notice: Under 35 U.S.C. 154(b), the term of this patent shall be extended for 0 days.

(21) Appl. No.: 09/536,498

(22) Filed: Mar. 27, 2000

Related U.S. Application Data

(60) Provisional application No. 60/131,821, filed on Apr. 29, 1999.

(51) Int. Cl.[7] .................................................... F02M 31/12
(52) U.S. Cl. ...................................... 123/549; 123/568.11
(58) Field of Search ..................................... 123/549, 557, 123/545, 568.11

(56) References Cited

U.S. PATENT DOCUMENTS

| | | | |
|---|---|---|---|
| 4,108,953 | * | 8/1978 | Rocco ................................... 123/549 |
| 4,308,845 | * | 1/1982 | Sarto .................................... 123/549 |
| 4,395,994 | * | 8/1983 | Goto et al. ........................... 123/549 |
| 4,582,040 | * | 4/1986 | Niblett ................................. 123/557 |
| 5,515,814 | | 5/1996 | Cooke . |
| 5,746,188 | | 5/1998 | Cooke . |
| 6,109,247 | * | 8/2000 | Hunt .................................... 123/549 |

* cited by examiner

*Primary Examiner*—Marguerite McMahon
(74) *Attorney, Agent, or Firm*—Thomas R. Lampe

(57) ABSTRACT

Apparatus for heating and vaporizing a liquid hydrocarbon fuel supplied to an internal combustion engine includes a housing having an inlet and an outlet. A venturi shaped inner sleeve of the apparatus is heated to promote vaporization of the liquid hydrocarbon fuel injected into the interior of the housing. Exhaust may be introduced into the interior of the housing and mixed with the vaporized and heated fuel. Further heating of the mixture can result in reformation of at least a portion thereof to a clean usable fuel prior to its introduction into an internal combustion engine.

12 Claims, 5 Drawing Sheets

FUEL SUPPLY AND COLD START APPARATUS FOR AN INTERNAL COMBUSTION ENGINE

This application is based on and claims the benefit of U.S. Provisional Patent Application Ser. No. 60/131,821, filed Apr. 29, 1999.

TECHNICAL FIELD

This invention relates to apparatus for use with an internal combustion engine for supplying fuel to the internal combustion engine. More particularly, the apparatus is utilized to heat, vaporize and otherwise treat and reform hydrocarbon fuel to promote engine efficiency and lower emissions. The apparatus is further characterized by its ability to supply reformed fuel to the internal combustion engine for cold start application, thus drastically reducing toxic emissions during engine warm-up.

BACKGROUND OF THE INVENTION

It is known that the heating and vaporization of gasoline and other types of liquid hydrocarbon fuels can increase efficiency or improve the performance of internal combustion engines. Arrangements for accomplishing such objectives are generally characterized by their complexity and relatively high expense. Reliability is also a problem and devices of this type have not found widespread acceptance for these and other reasons.

My U.S. Pat. No. 5,515,814, issued May 14, 1996, discloses an apparatus and method for supplying fuel to an internal combustion engine. In the system disclosed in this patent a liquid hydrocarbon fuel is injected into a fuel chamber to form a mixture of vaporized liquid hydrocarbon fuel and heated exhaust gases. The mixture is passed through a passageway and further heated by non-contacting exhaust gases from the internal combustion engine to reform the mixture of vaporized liquid hydrocarbon fuel and heated exhaust gases in the passageway.

My U.S. Pat. No. 5,746,188, issued May 5, 1998, also discloses an apparatus and method for supplying fuel to an internal combustion engine. In the system disclosed in this patent a liquid hydrocarbon fuel is injected into a fuel chamber heated by electrical means to form a mixture of vaporized liquid hydrocarbon fuel and heated exhaust gases. The mixture is passed through a passageway heated by electrical means and further heated to reform the mixture of vaporized liquid hydrocarbon fuel and heated exhaust gases in the passageway.

DISCLOSURE OF INVENTION

The apparatus of the present invention is characterized by its relative simplicity of construction and compactness. No catalysts are required for its operation. The apparatus is further characterized by its high reliability during operation. Employment of the apparatus will serve to promote engine efficiency and drastically lower or even eliminate toxic emissions.

The apparatus of the present invention is for use with an internal combustion engine and is for supplying reformed fuel to the internal combustion engine. The apparatus is further characterized by its ability to supply reformed fuel to the internal combustion engine for cold start application.

The apparatus includes housing means having a housing interior and including a venturi shaped inner sleeve. The inlet and the outlet of the housing are spaced from one another and communicate with the housing interior. The inlet is for receiving liquid hydrocarbon fuel and introducing the liquid hydrocarbon fuel into the housing interior.

Heating means is provided for heating the venturi shaped inner sleeve. The venturi shaped inner sleeve, heated by the heating means, heats and promotes the vaporization of the liquid hydrocarbon fuel as the liquid hydrocarbon fuel passes through the housing interior from the inlet to the outlet. Exhaust gases from the internal combustion engine are introduced into the housing interior and mixed with the liquid hydrocarbon fuel.

The mixture of vaporized hydrocarbon fuel and exhaust gases exit the housing interior and are introduced into a conduit where heating means is provided and the mixture is further heated and reformed into a clean usable fuel.

The heating means for the housing interior and conduit can bring the apparatus to operating temperatures within a short period of time, such as three to five seconds. This drastically reduces or even eliminates toxic emissions during the initial four to five minutes of engine operation.

Other features, advantages, and objects of the present invention will become apparent with reference to the following description and accompanying drawings.

BEST MODE FOR CARRYING OUT THE INVENTION

Figure 1:
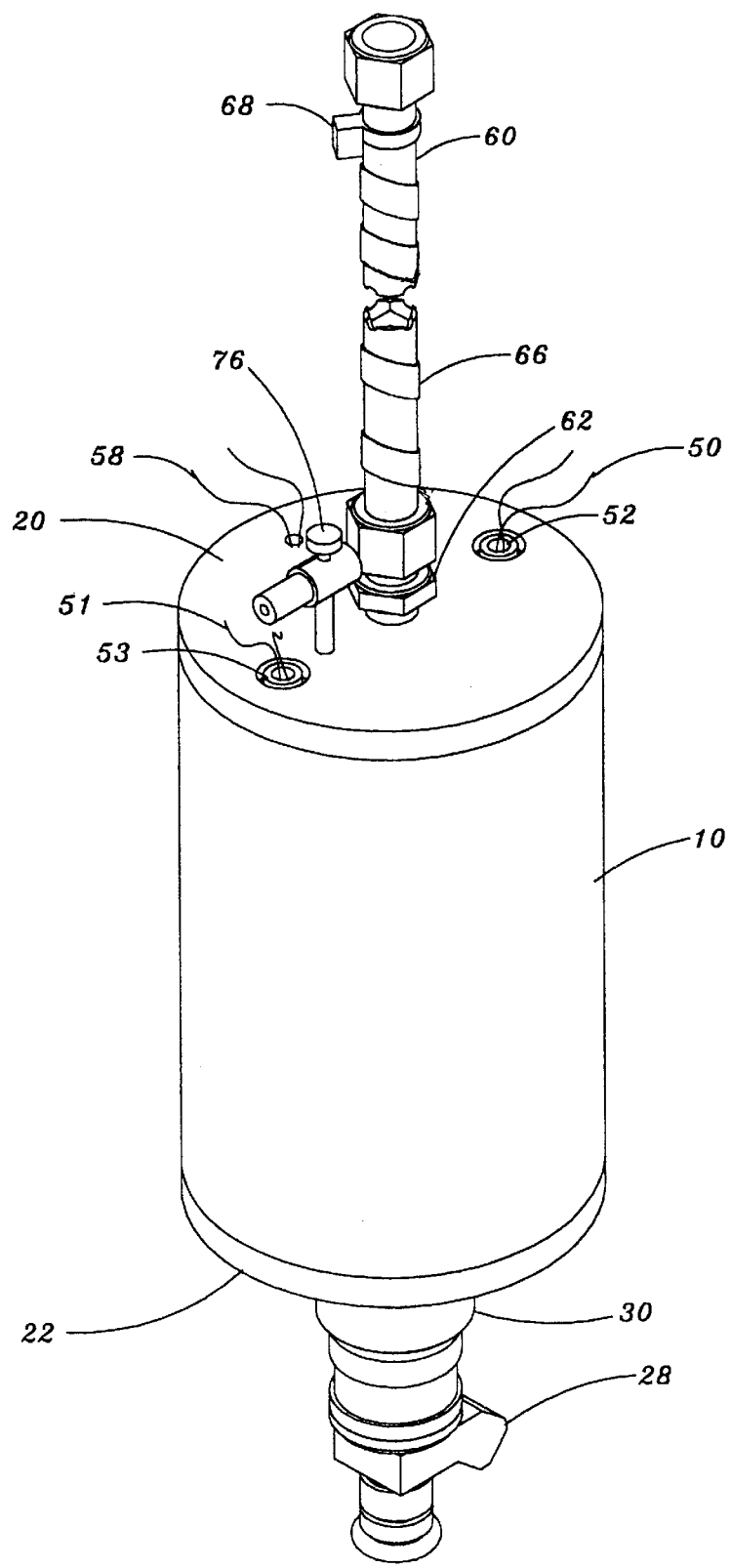
FIG. 1 is a perspective view of apparatus constructed in accordance with the teachings of the present invention.
Figure 2:
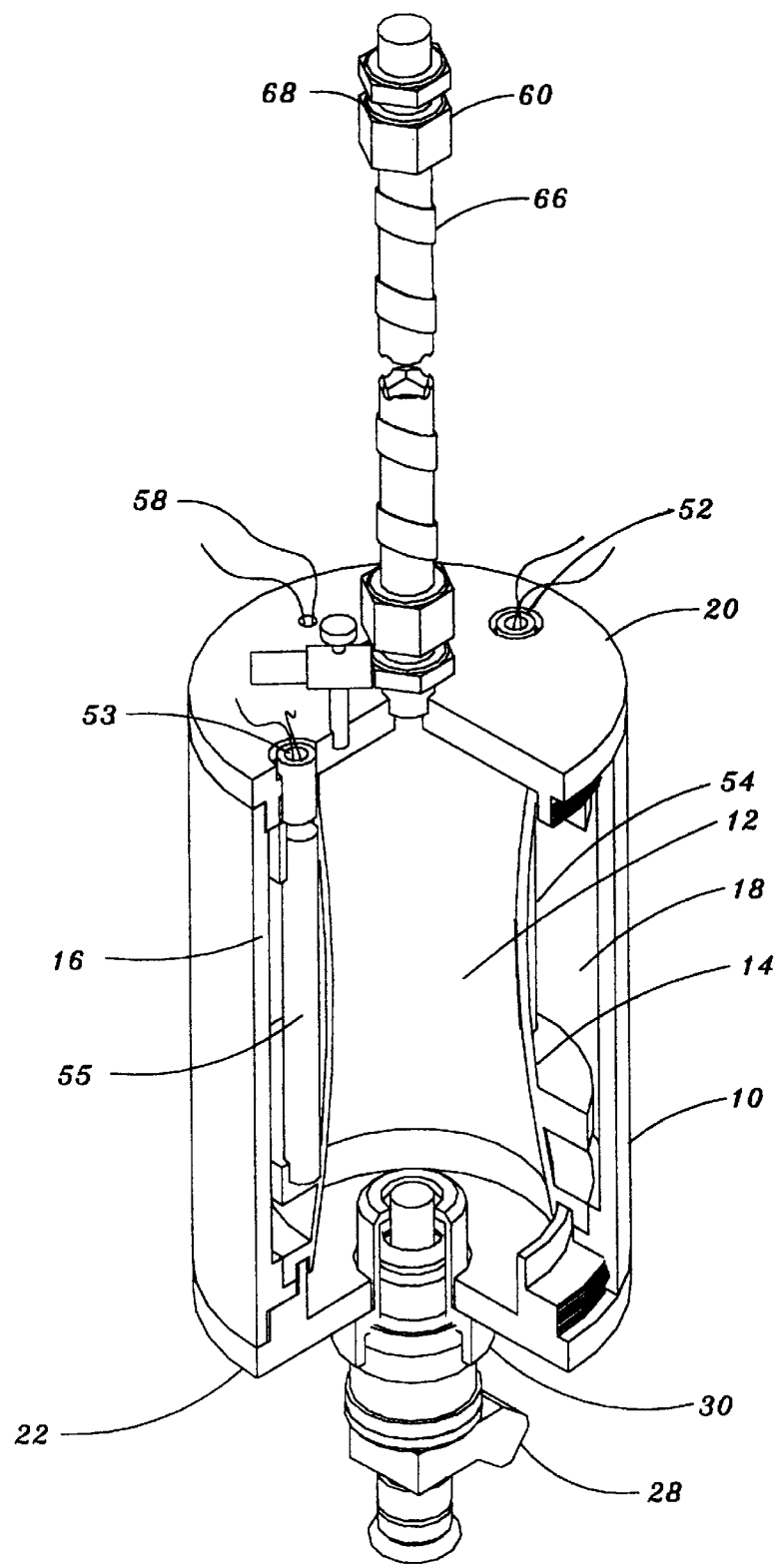
FIG. 2 is a slightly enlarged perspective view of the apparatus with a portion thereof broken away to disclose interior components thereof.

Referring now to FIGS. 1–5 of the drawings, apparatus constructed in accordance with the teachings of the present invention includes a housing 10 defining a housing interior 12. The housing 10 includes a venturi shaped inner sleeve or venturi tube 14 formed of a suitable heat conducting or transmitting material, such as aluminum, and an outer protective layer 16 formed of a suitable heat insulating material such as ceramic material. An annular space 18 is defined by the inner and outer sleeves.

Housing 10 also includes two end caps 20, 22 which are threadedly engaged with the venturi shaped inner sleeve 14 or otherwise secured thereto. The passageway of sleeve or tube 14 is restricted between the end caps. End cap 22 defines an inlet 24 and end cap 20 defines an outlet 26. A nickel plated baffle 29 is threadedly engaged or otherwise secured to end cap 20 at outlet 26. The end caps may be formed of any suitable material such as aluminum. At least one fuel injector 28 is secured to end cap 22 by a sleeve 30 formed of ceramic or other suitable material positioned in inlet 24 and provides for the injection of gasoline or other liquid hydrocarbon fuels into the housing interior 12.

Extending through two openings in end cap 20 are wire leads 50 and 51 leading to two stainless steel resistance cartridge heating elements 54 and 55. Cartridge heating elements are commercially available, for example from Omega Engineering, Inc. of Stamford, Connecticut. The wire leads 50, 51 are protected by ceramic insulators 52 and 53 which are secured by any expedient to end cap 20. The heating elements 54, 55 are secured to the venturi shaped inner sleeve 14 by any suitable expedient and are capable of operating at a pre-selected temperature, preferably at least 220 degrees Fahrenheit.

It will be appreciated that when the heating elements 54, 55 are activated, the venturi shaped inner sleeve 14 of the housing will be heated. Heating elements 54, 55 are monitored by a sensor 58 having a wire lead and which is controlled by a CPU 82 (FIG. 5), thus controlling the temperature of the inner venturi shaped sleeve 14.

Secured to and projecting from end cap 20 at outlet 26 is a tubular shaped conduit 60 defining a conduit interior. In the arrangement illustrated, a threaded nipple 62 is employed to secure the conduit to the end cap 20; however, any suitable expedient may be employed for this purpose. Conduit 60 is constructed of a suitable heat transmissive material, such as copper. Wrapped about conduit 60 is a silicone rubber encapsulated heating element 66, such as manufactured by Omega Engineering, Inc. of Stamford, Conn.; however any suitable heating means may be employed. Heating element 66 is secured to conduit 60 by any acceptable expedient and is capable of operating at a pre-selected temperature, preferably at least 350 degrees Fahrenheit.

It will be appreciated that heating element 66 extends substantially the full length of conduit 60 and when activated, conduit 60 will be heated. Heating element 66 is monitored by a sensor 68 which is controlled by a CPU 82 (FIG. 5), thus controlling the temperature of conduit 60.

Figure 3:
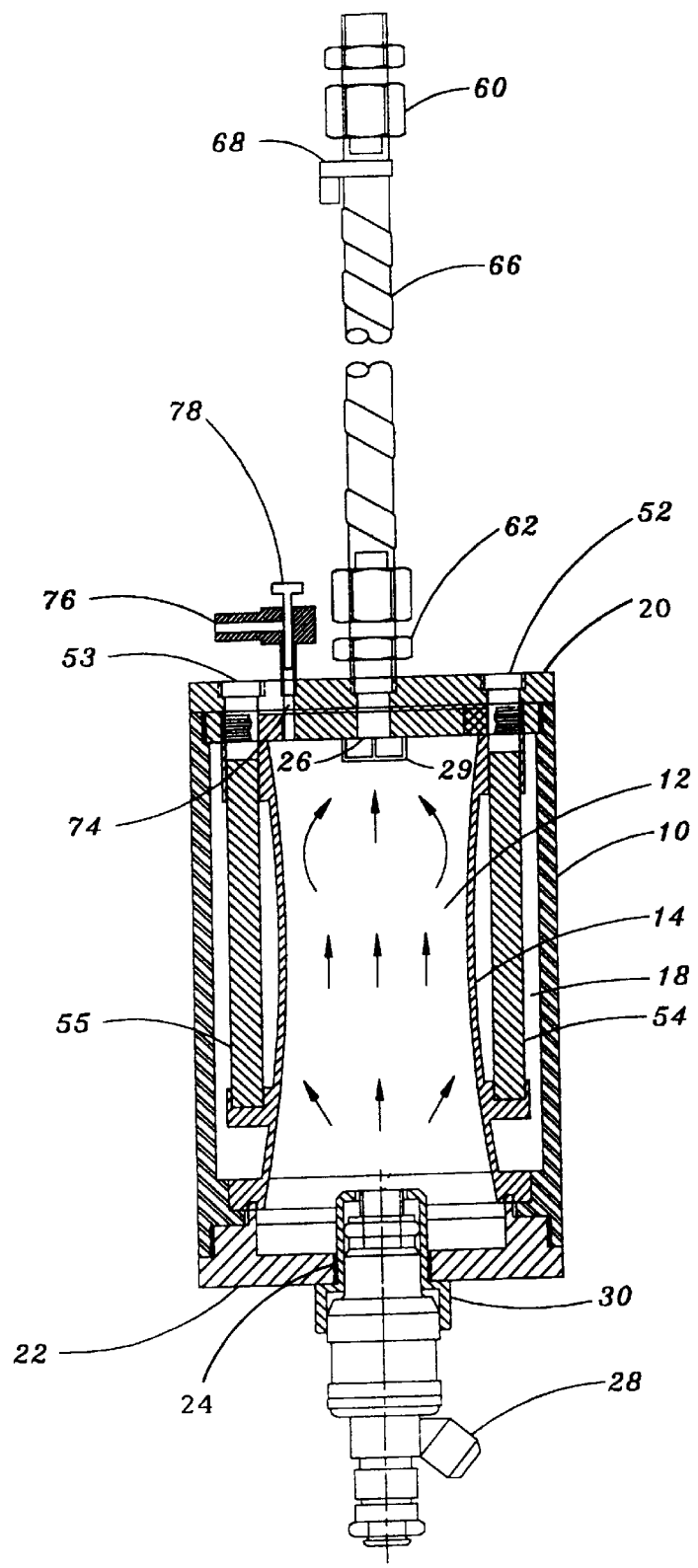
FIG. 3 is a frontal cross-sectional view of the apparatus, a portion thereof broken away.
Figure 4:
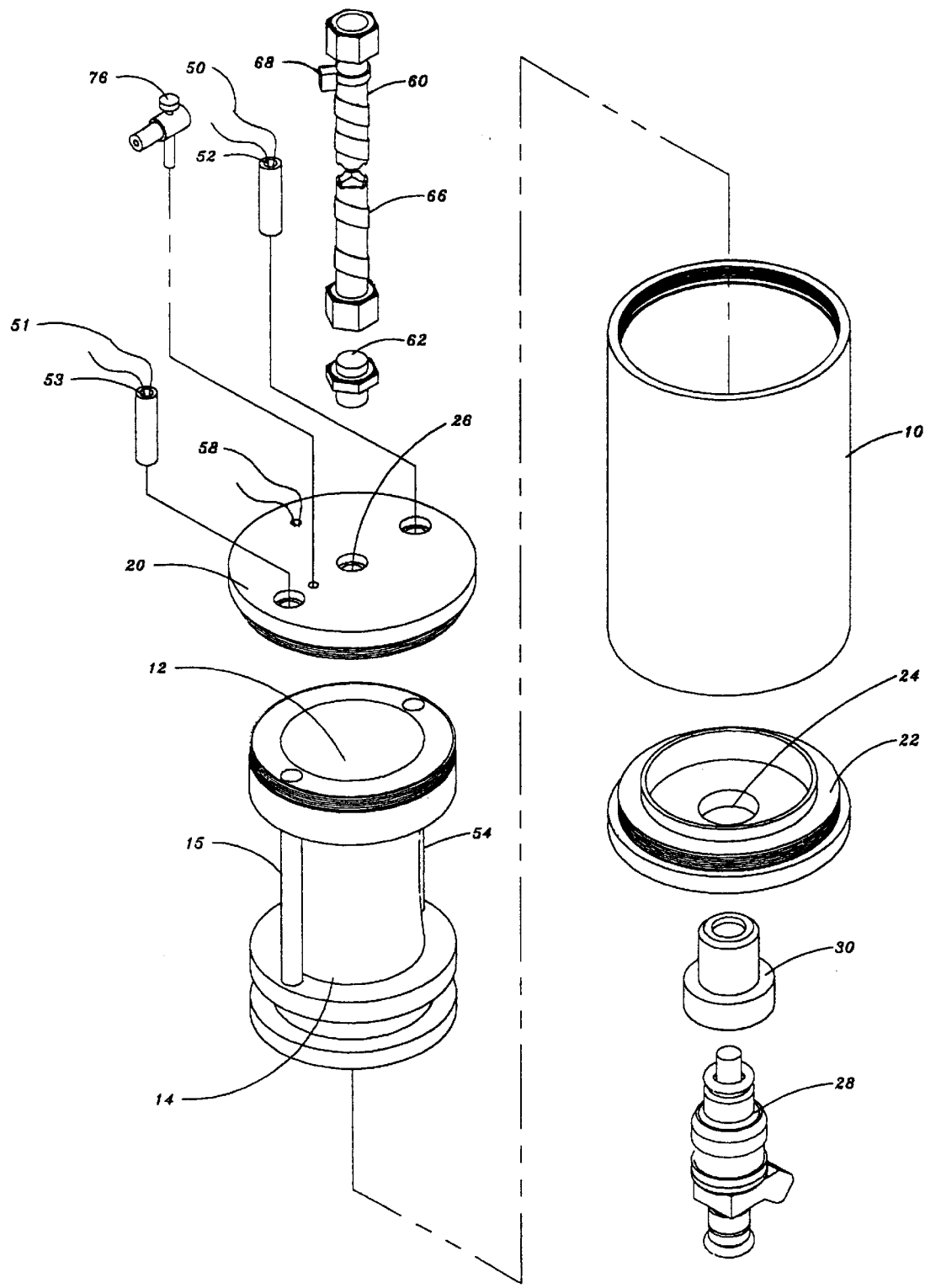
FIG. 4 is an exploded view of the apparatus.

FIG. 3 illustrates with arrows the flow of liquid hydrocarbon fuel through housing 10 during operation of the apparatus. With additional reference to FIG. 5, the fuel is received from a conventional fuel rail and introduced into the interior of housing 10 through inlet 24. The liquid hydrocarbon fuel passes from the inlet to the outlet. During such movement the fuel is heated in the venturi shaped inner sleeve 14 of the housing. This results in vaporization of the fuel by the time it reaches outlet 26.

An inlet opening 74 is formed in end cap 20 and a fitting 76 defining a fitting passageway is threadedly engaged or otherwise secured to the end cap 20 so that the fitting passageway is in communication with inlet opening 74. A needle valve 78, or other suitable means, is employed to control flow through the fitting passageway and inlet opening 74. Through suitable conduit means (not shown) the passageway of fitting 76 may receive exhaust gases produced by an internal combustion engine (not shown) with which the apparatus is operatively associated. These exhaust gases are mixed with the heated and vaporized liquid hydrocarbon fuel within housing interior 12 just prior to the heated and vaporized fuel exiting outlet 26 into conduit 60.

As stated above, conduit 60 is continuously heated by heating element 66. This will result in heating of the mixture of vaporized liquid hydrocarbon fuel and heated exhaust gases within conduit 60. Sufficient heating of the mixture within the confines of conduit 60 will cause reaction of the mixture with resultant combustion and reformation of all or at least a portion thereof to a clean usable fuel in the manner suggested by my U.S. Pat. No. 5,746,188 issued May 5, 1998. The mixture exiting the conduit 60 may be directed to the internal combustion engine from which the exhaust gases were received for complete combustion.

Figure 5:
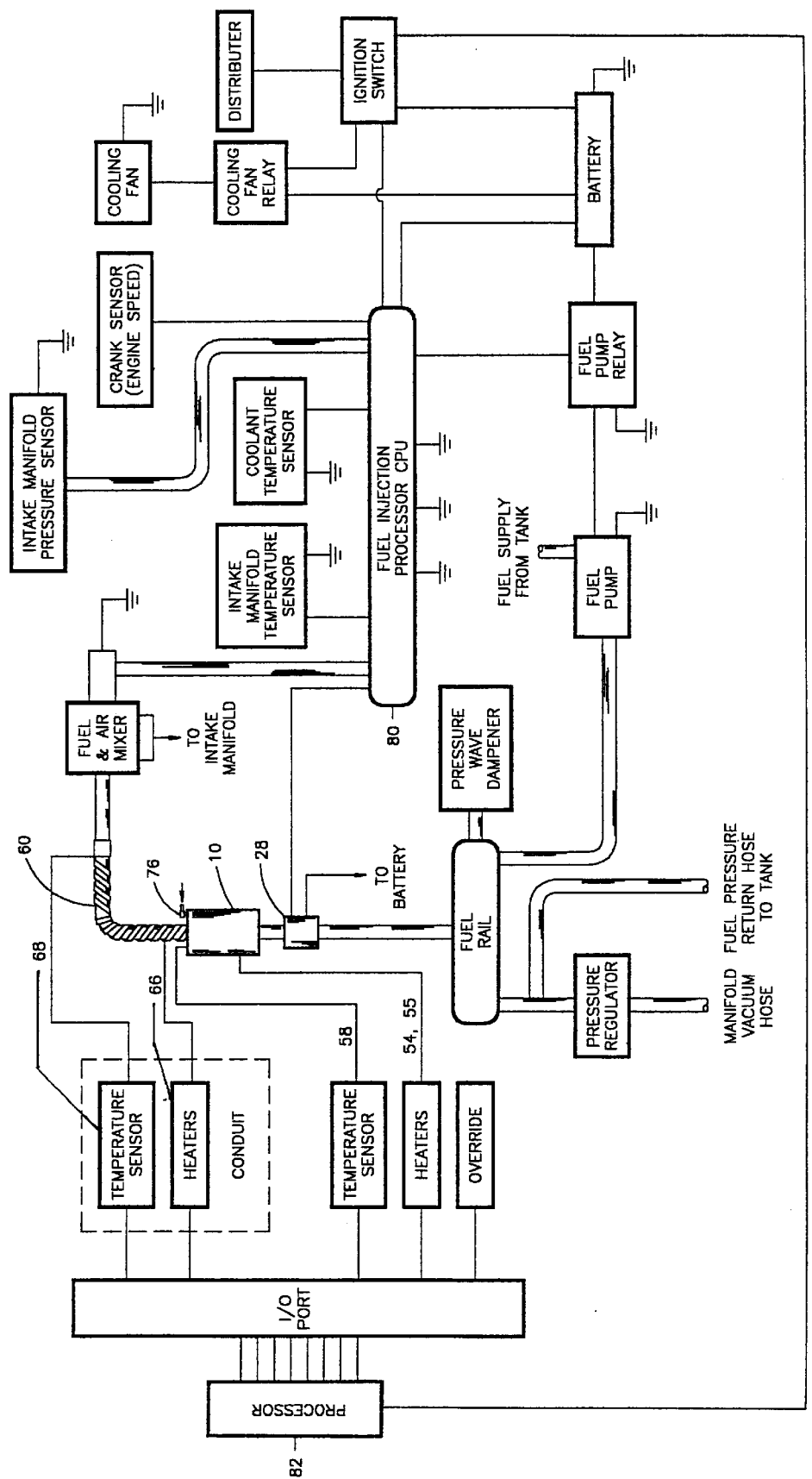
FIG. 5 is a schematic diagram illustrating the apparatus of the present invention in combination with related structure in a representative operating environment.

FIG. 5 shows the apparatus in a typical operating environment with other structure. Since such structure is known in the internal combustion engine and fuel injector art and forms no part of the present invention per se it will not be described in detail.

Suffice it to say that the structure includes a CPU 80. Inputs to the CPU 80 include those from a crank sensor, an intake manifold pressure sensor, a throttle position sensor, an intake manifold temperature sensor and a coolant temperature sensor.

The CPU 80 is suitably programmed so that the crank sensor input will function to turn the fuel injector 28 on and off. As indicated above, more than one injector may be employed when practicing this invention. The function of the intake manifold pressure sensor is to regulate how long the fuel injector stays open. The throttle position sensor performs a similar function but to a lesser degree. The intake manifold temperature sensor and the coolant temperature sensor inputs provide for slight mixture modification.

The outputs from the CPU 80 go to the fuel injector through the fuel injector drives.

Further, the structure includes a CPU 82. Inputs to the CPU 82 include those from heating elements 54, 55, heating element 66, and heat sensors 58, 68.

The CPU 82 is suitably programmed so that heating sensor 58 turns heating elements 54,55 on and off thus controlling the temperature of the venturi shaped inner sleeve 14 and housing interior 12. CPU 82 is also programmed so that heating sensor 68 turns heating element 66 on and off thus controlling the temperature of conduit 60.

The fuel pump relay is powered by a battery and provides power to the fuel pump. The relay is activated by the ignition switch. The fuel pump is fed fuel from the fuel tank and in turn provides available pressure (e.g. 70 PSI) to the fuel rail. The fuel rail then regulates the fuel supply to the fuel injector at a lesser pressure (e.g. 30 PSI) and returns the rest of the fuel to the fuel tank through a return hose. The fuel injector 28 injects the fuel into the apparatus of the present invention which reforms the fuel into a clean useable fuel and supplies the reformed fuel to a fuel and air mixer and/or injectors which in turn supplies the correct mixture to the engine. Or the reformed fuel can be introduced directly into the injector port of the engine. The apparatus may also be employed simply to provide heated vaporized fuel to the engine.

With the disclosed arrangement, the components of the apparatus can be brought to operating temperatures within three to five seconds. This drastically reduces or even eliminates toxic emissions during the initial four to five minutes of engine operation.

What is claimed is:

1. Apparatus for use with an internal combustion engine for supplying fuel to said internal combustion engine, said apparatus comprising, in combination:

a housing having spaced housing ends defining a housing interior, one of said housing ends defining an inlet and the other of said housing ends defining an outlet, said inlet and said outlet being spaced from one another and communicating with said housing interior, said inlet for receiving liquid hydrocarbon fuel and introducing said liquid hydrocarbon fuel into said housing interior;

a sleeve formed of heat conducting material located within said housing interior and extending between the housing ends for receiving liquid hydrocarbon fuel from said inlet, said sleeve comprising a venturi tube defining a fluid flow passageway restricted between said housing ends and in communication with said inlet and said outlet;

heating means for heating said sleeve whereby liquid hydrocarbon fuel passing through the fluid-flow passageway of said sleeve is heated prior to reaching said outlet; and a conduit leading from said outlet defining a conduit interior communicating with the fluid-flow passageway.

2. The apparatus according to claim 1 additionally comprising internal combustion engine exhaust introducing means for introducing internal combustion engine exhaust into said sleeve to mix with the heated liquid hydrocarbon fuel passing through said fluid-flow passageway.

3. The apparatus according to claim 2 additionally comprising flow control means for controlling the flow of internal combustion engine exhaust into said sleeve.

4. The apparatus according to claim 1 wherein said housing and said sleeve define a space therebetween and wherein said heating means comprises at least one electrical resistance heater disposed in said space and adjacent to said sleeve.

5. The apparatus according to claim 4 additionally comprising means for controlling the operation of said at least one electrical resistance heater and the heat of said sleeve.

6. The apparatus according to claim 4 wherein said at least one electrical resistance heater comprises a cartridge heating element connected to the sleeve, said cartridge heating element including wiring extending to a location external of said housing.

7. The apparatus according to claim 1 additionally comprising conduit heating means for heating said conduit.

8. The apparatus according to claim 7 wherein said conduit heating means includes an elongated electrical resistance element extending along said conduit to heat said conduit and further heat the liquid hydrocarbon fuel after the liquid carbon fuel has exited said fluid-flow passageway through said outlet.

9. The apparatus according to claim 1 additionally comprising at least one fuel injector connected to the housing end defining said inlet for injecting liquid hydrocarbon fuel into said inlet.

10. Apparatus for use with an internal combustion engine for supplying fuel to said internal combustion engine, said apparatus comprising, in combination:

a sleeve having spaced open sleeve ends formed of heat conducting material and comprising a venturi tube defining a fluid-flow passageway restricted between the sleeve ends;

a first end cap connected to one of said sleeve ends and defining an outlet communicating within said fluid-flow passageway;

a second end cap connected to the other of said sleeve ends and defining an inlet communicating with said fluid-flow passageway, said inlet for receiving liquid hydrocarbon fuel and introducing said liquid hydrocarbon fuel into said fluid-flow passageway;

at least one heater for heating said sleeve whereby liquid hydrocarbon fuel passing through the fluid-flow passageway is heated prior to reaching said outlet; and a conduit for delivering the hydrocarbon fuel heated in said fluid-flow passageway to an internal combustion engine.

11. The apparatus according to claim 10 additionally comprising internal combustion engine exhaust introducing means located at the end of said sleeve connected to said first end cap for introducing internal combustion engine exhaust into said sleeve to mix with the heated liquid hydrocarbon fuel passing through said fluid-flow passageway.

12. The apparatus according to claim 10 wherein said at least one heater comprises at least one electrical resistance heater in engagement with said sleeve outside of said fluid-flow passageway.

* * * * *